US012655616B2

(12) United States Patent
Eilmus et al.

(10) Patent No.: US 12,655,616 B2
(45) Date of Patent: Jun. 16, 2026

(54) RECYCLED WATER SYSTEM

(71) Applicant: Kohler Co., Kohler, WI (US)

(72) Inventors: Niels Eilmus, Sheboygan, WI (US);
Chanseol Chung, Milwaukee, WI (US);
Clayton Garrels, Kohler, WI (US);
William Kuru, Plymouth, WI (US)

(73) Assignee: Kohler Co., Kohler, WI (US)

( * ) Notice: Subject to any disclaimer, the term of this patent is extended or adjusted under 35 U.S.C. 154(b) by 660 days.

(21) Appl. No.: 17/347,451

(22) Filed: Jun. 14, 2021

(65) Prior Publication Data

US 2021/0404152 A1 Dec. 30, 2021

Related U.S. Application Data

(60) Provisional application No. 63/045,970, filed on Jun. 30, 2020.

(51) Int. Cl.
*E03B 1/04* (2006.01)
*C02F 1/00* (2023.01)
*C02F 103/00* (2006.01)

(52) U.S. Cl.
CPC .............. *E03B 1/042* (2013.01); *C02F 1/001* (2013.01); *C02F 1/008* (2013.01); *C02F 2103/002* (2013.01); *C02F 2201/005* (2013.01); *C02F 2201/007* (2013.01); *C02F 2209/42* (2013.01); *E03B 2001/045* (2013.01)

(58) Field of Classification Search
CPC .... E03B 1/042; E03B 2001/045; E03B 1/041; E03B 7/04; E03B 7/074; E03B 7/078; C02F 1/001; C02F 1/008; C02F 2103/002; C02F 2201/005; C02F 2201/007; C02F 2209/42; C02F 1/00; C02F 1/441; C02F 3/1268; Y02A 20/30
See application file for complete search history.

(56) References Cited

U.S. PATENT DOCUMENTS

| | | | |
|---|---|---|---|
| 3,224,013 | A | 12/1965 | Tubbs |
| 4,077,602 | A | 3/1978 | Klessig |
| 4,086,668 | A | 5/1978 | Tubbs |
| 5,142,712 | A | 9/1992 | Hennessy |

(Continued)

FOREIGN PATENT DOCUMENTS

| | | |
|---|---|---|
| CN | 2656513 Y | 11/2004 |
| CN | 201443130 U | 4/2010 |

(Continued)

OTHER PUBLICATIONS

Chinese Office Action from Chinese Patent Application No. 2023060300013410, dated Jun. 3, 2023, 16 pages. (including English summary).

(Continued)

*Primary Examiner* — Patrick Orme
(74) *Attorney, Agent, or Firm* — Lempia Summerfield Katz LLC

(57) ABSTRACT

A modular wall frame for a recycled water system, the modular wall frame includes a horizontal frame module, a vertical frame module, a greywater tank coupled to the horizontal frame or the vertical frame, at least one water consuming appliance drain coupled to the horizontal frame module, and at least one water consuming appliance water input coupled to the vertical frame module.

20 Claims, 15 Drawing Sheets

(56)                    References Cited

U.S. PATENT DOCUMENTS

| | | | |
|---|---|---|---|
| 5,243,719 | A | 9/1993 | Mcdonald et al. |
| 5,579,542 | A | 12/1996 | Hayman |
| 5,642,533 | A | 7/1997 | Young |
| 5,845,346 | A | 12/1998 | Johnson, Jr. |
| 5,887,292 | A | 3/1999 | Goren |
| 6,383,369 | B2 | 5/2002 | Elston |
| 7,325,258 | B2 | 2/2008 | Asada et al. |
| 8,141,584 | B1 | 3/2012 | Sweeney et al. |
| 9,579,607 | B2 | 2/2017 | Hong et al. |
| 9,975,783 | B2 | 5/2018 | Garios |
| 10,094,096 | B2 | 10/2018 | Lee |
| 10,214,880 | B2 | 2/2019 | Robb et al. |
| 10,655,313 | B2 | 5/2020 | Garrels et al. |
| 2010/0125938 | A1 | 5/2010 | Billon |
| 2011/0226341 | A1 | 9/2011 | Platteel et al. |
| 2012/0037234 | A1 | 2/2012 | Eckman |
| 2012/0125443 | A1 | 5/2012 | Borg et al. |
| 2013/0140233 | A1 | 6/2013 | Taniguchi et al. |
| 2013/0180928 | A1* | 7/2013 | Vielma ................... C02F 1/008 210/96.1 |
| 2014/0059755 | A1* | 3/2014 | Garrels ...................... E03D 1/34 4/363 |
| 2014/0262982 | A1 | 9/2014 | Bailin |
| 2016/0016836 | A1 | 1/2016 | Sudnick et al. |
| 2016/0030891 | A1 | 2/2016 | Oskoui |
| 2017/0088436 | A1 | 3/2017 | Espinoza et al. |
| 2017/0172377 | A1* | 6/2017 | Lee .......................... C02F 1/001 |
| 2017/0297939 | A1 | 10/2017 | Tseng et al. |
| 2018/0127953 | A1* | 5/2018 | Noren ................. A47L 15/4225 |

FOREIGN PATENT DOCUMENTS

| | | | | |
|---|---|---|---|---|
| CN | 201695469 | U | 1/2011 | |
| CN | 202370053 | U | 8/2012 | |
| CN | 103850297 | A | 6/2014 | |
| CN | 204126035 | U | 1/2015 | |
| CN | 104695513 | A | 6/2015 | |
| CN | 205000419 | U | 1/2016 | |
| CN | 106436817 | A | 2/2017 | |
| CN | 106884461 | A | 6/2017 | |
| CN | 107012912 | A | 8/2017 | |
| CN | 206955834 | U | 2/2018 | |
| CN | 210421299 | U | 4/2020 | |
| IN | 201841031140 | A | 8/2018 | |
| KR | 20030077887 | A | 10/2003 | |
| WO | 2013068545 | A1 | 5/2013 | |
| WO | WO-2019164436 | A1 * | 8/2019 | ............... A47K 3/28 |
| WO | 2020020455 | A1 | 1/2020 | |
| WO | WO-2020039278 | A1 * | 2/2020 | |

OTHER PUBLICATIONS

Examination Report from Indian Patent Application No. 202114028789, dated Mar. 14, 2022, 6 pages.

Chinese Office Action from Chinese Patent Application No. 202110734245.7, dated Jan. 10, 2023, 12 pages (including English summary).

Chinese Office Action for Chinese Patent Application No. 2023053000072550, dated May 30, 2023, 25 pages. (including English translation).

Chinese Office Action for Chinese Patent Application No. 2023101901980250, dated Oct. 19, 2023, 19 pages. (including English translation).

Chinese Office Action from Chinese Patent Application No. 202110689390.8, dated Dec. 8, 2022, 21 pages. (including English summary).

Examination Report from Indian Patent Application No. 202114028788, dated Nov. 21, 2022, 7 pages.

* cited by examiner

100

RECEIVE AT LEAST ONE SENSOR SIGNAL INDICATIVE OF AT LEAST ONE WATER LEVEL IN THE GREYWATER TANK — S1

COMPARE THE AT LEAST ONE SENSOR SIGNAL TO A PLURALITY OF GREYWATER TANK REFERENCE LEVELS — S2

GENERATE AT LEAST ONE VALVE ACTUATION SIGNAL IN RESPONSE TO THE COMPARISON OF THE AT LEAST ONE SENSOR SIGNAL WITH THE PLURALITY OF GREYWATER TANK REFERENCE LEVELS — S3

| RECEIVE SENSOR DATA FOR A PROPERTY OF A GREYWATER SOURCE | — S101 |
| COMPARE THE PROPERTY TO A THRESHOLD VALUE | — S103 |
| GENERATE A VLAVE COMMAND BASED ON THE THRESHOLD VALUE | — S105 |
| PROVIDE THE GRAYWATER TO A WATER CONSUMING APPLIANCE OR A DRAIN IN RESPONSE TO THE VALVE COMMAND | — S107 |

RECYCLED WATER SYSTEM

This application claims priority benefit of Provisional Application No. 63/045,970 filed Jun. 30, 2020, which is hereby incorporated by reference in its entirety.

FIELD

The present application relates generally to water conservation and recycling in indoor environments.

BACKGROUND

Water consumption is a growing problem. According to recent reports in approximately 25 years, fresh water may become very scarce. Some predictions state that the entire world's population may suffer a water shortage or otherwise be adversely affected by 2040. Within an ever growing population is the ongoing demand for commercial goods in which requires water for manufacturing. This industrial practice particularly in time of drought and with the ongoing global pollution of lakes, rivers and oceans only continues to aggravate the potentials for looming shortages.

According to the Environmental Protection Agency, (EPA) the average American family uses approximately 870 liters of water per day. Efforts to reduce consumption to a fraction of this level may require drastic changes in lifestyle unless significant changes are made to the everyday practices of bathing, laundry, and cleaning. Therefore, being presented is a method and apparatus capable of implementation into any structure to perform water conservation through recycling.

SUMMARY

In an example embodiment, a modular wall frame for a recycled water system is described. The modular wall frame includes a horizontal frame module, a vertical frame module, a greywater tank coupled to the horizontal frame or vertical frame, at least one water consuming appliance drain coupled to the horizontal frame module, and at least one water consuming appliance water input coupled to the vertical frame module.

In another example embodiment, a water recycling system is described. The water recycling system includes a filter, a treatment device, and a delivery device. The filter is configured to receive greywater from at least one water consuming appliance. The treatment device is configured to treat the filtered greywater. The delivery device is configured to provide the treated greywater from the treatment device to at least one greywater consuming device.

In yet another embodiment, a module wall frame for a recycled water system is described. The modular wall frame includes a horizontal frame module and a vertical frame module. The horizontal frame module or the vertical frame module is coupled to a greywater tank. The horizontal frame module or the vertical frame module is coupled to at least one water consuming appliance drain. The horizontal frame module or the vertical frame module is coupled to at least one water consuming appliance water input.

In an example method, a method for operation of a greywater tank is described. The method includes receiving at least one sensor signal indicative of at least one water level in the greywater tank. The at least one sensor signal is compared to a plurality of greywater tank reference levels. At least one valve actuation signal is generated in response to the comparison of the at least one sensor signal with the plurality of greywater tank reference levels.

In yet a further embodiment, a multi-stage water recycling system is described. The system includes a first set of water consuming appliances that consumes fresh water and outputs a first tier of greywater. A first water recycling treatment device treats the first tier of greywater and outputs a treated first tier of greywater. A second set of water consuming appliances consumes the treated first tier of greywater and outputs a second tier of greywater. A second water recycling treatment device treats the second tier of greywater and outputs a treated second tier of greywater. A third set of water consuming appliances consumes the treated second tier of greywater.

In yet another embodiment, a multi-stage recycling system is described. The system includes a first set of water consuming appliances that consumes fresh water and outputs a first tier of greywater. A first water recycling treatment device treats the first tier of greywater and outputs a treated second tier of greywater. A second water recycling treatment device treats a first portion of the treated second tier of greywater to a first tier of greywater. A second set of water consuming appliances consumes a second portion of the treated second tier of greywater and outputs wastewater. A third set of water consuming appliances consumes a portion of the first tier of greywater.

BRIEF DESCRIPTION OF THE DRAWINGS

Exemplary embodiments are described herein with reference to the following drawings, according to an exemplary embodiment.

DETAILED DESCRIPTION

Water entry and exit is dependent upon a series of pipes commonly referred to as plumbing and where upon installation, is regulated under specific aspects of building codes. Building codes are referred to by building inspectors to insure a quality of construction. Plumbing codes refer to three different types of water associated with construction; potable, grey and black water. During construction, potable water rates the highest in priority in regards to safe delivery and whereas household waste water commonly referred to as greywater, is generated daily by households while doing chores such as, washing dishes, clothes, brushing teeth, taking baths, showers, or any water utilized in which is not directly related to toilets or urinals. The following embodiments introduce defined tiers of greywater depending on the treatments applied to the greywater or properties of the greywater determined by one or more sensors. The third water classification is considered blackwater or wastewater which is generated and directed into the sewer or septic system after flushing toilets or urinals. The following embodiments provide novel modular structures for handling the exchange of greywater between devices. The following embodiments provide devices that utilize greywater using novel techniques.

In most cases, both grey and black water exits the structure together and is directed flow into municipal sewer lines or where in rural areas, into septic tanks for treatment. Generally, wastewater exiting methods are reliant upon gravity fall through piping in order to reach its final destination.

The following embodiments alone in combination may allow a building or home to achieve water conservation goals. One example goal may be the consumption of only 50 liters of water in a single day.

Figure 1:
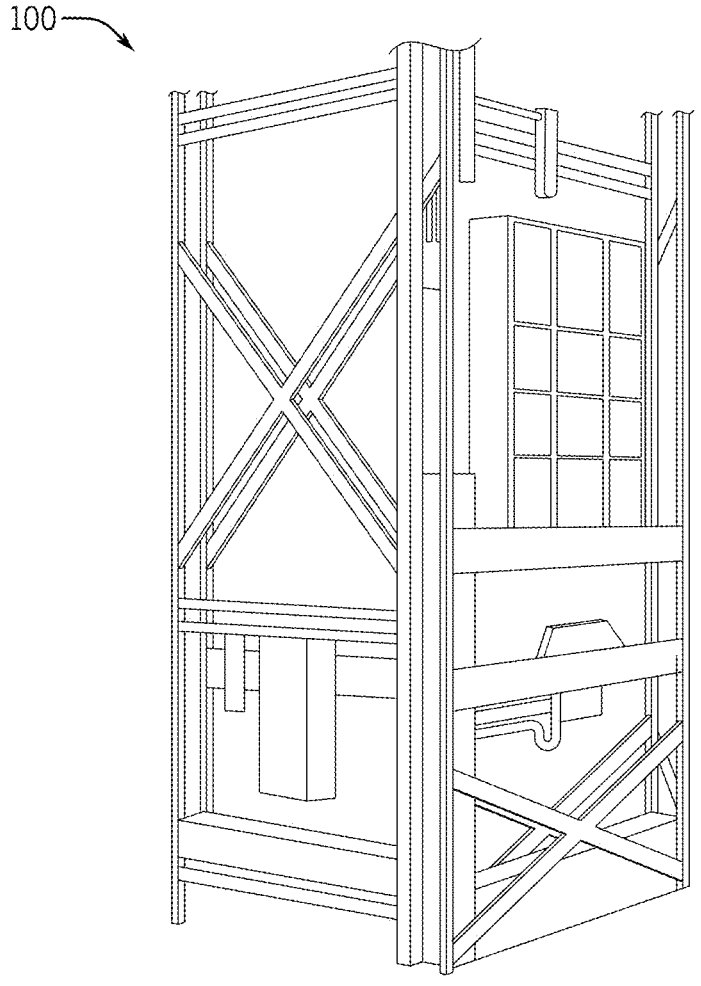
FIG. 1 illustrates a modular flexible frame 100 with a recycled water system of a bathroom.

FIG. 1 illustrates a modular flexible frame 100 with a recycled water system of a bathroom. The frame 100 is modular in that it may be formed of modules that are fastened together. The frame 100 may be supported by the wall of a building and provide plumbing to the bathroom. The frame 100 provides a space saving concept that fits within the walls and utilizes space within the wall. For example, the frame 100 may include storage or shelving in the space within the wall. As another example, the frame 100 may provide support to one or more devices, which eliminates additional support for the devices. Finally, as described in the following embodiments, the frame 100 permits for water recycling systems within the wall, which conserve water.

In one example, the frame 100 of FIG. 1 may include at least two vertical frame modules. Vertical frame modules extend substantially in the direction of gravity. The vertical frame 100 may include braces or supports extending in multiple directions. The example of FIG. 1 includes horizontal supports, vertical supports, diagonal supports and others. Vertical frame modules may be mounted into the wall of a building (e.g., load supporting wall). Vertical frame modules may form a partial wall between appliances. For example, in a bathroom, a partial wall may be located between a toilet in a shower, a toilet and a lavatory, a shower and a bathtub, or another combination. As discussed in further examples, the frame 100 may also include a horizontal frame module, which may extend or otherwise form a floor or a ceiling.

The horizontal frame module or the vertical frame module may be coupled to a greywater tank. The greywater tank receives used or spent water from one or more water consuming appliances. The horizontal frame module or the vertical frame module may be coupled to at least one water consuming appliance drain in order to facilitate the spent water exiting the water consuming appliance and entering the greywater tank. There may be at least one greywater supply line supported by the modular wall frame and coupled to the vertical frame.

The greywater tank may also provide the spent water (e.g., after one or more filtering or transformation processes) to a water consuming appliance. The horizontal frame module or the vertical frame module is coupled to at least one water consuming appliance water input in order to facilitate the water exiting the greywater tank and entering the water consuming appliance water input. There may be at least one fresh water supply line supported by the modular wall frame 100 and coupled to the vertical frame.

Figure 2:
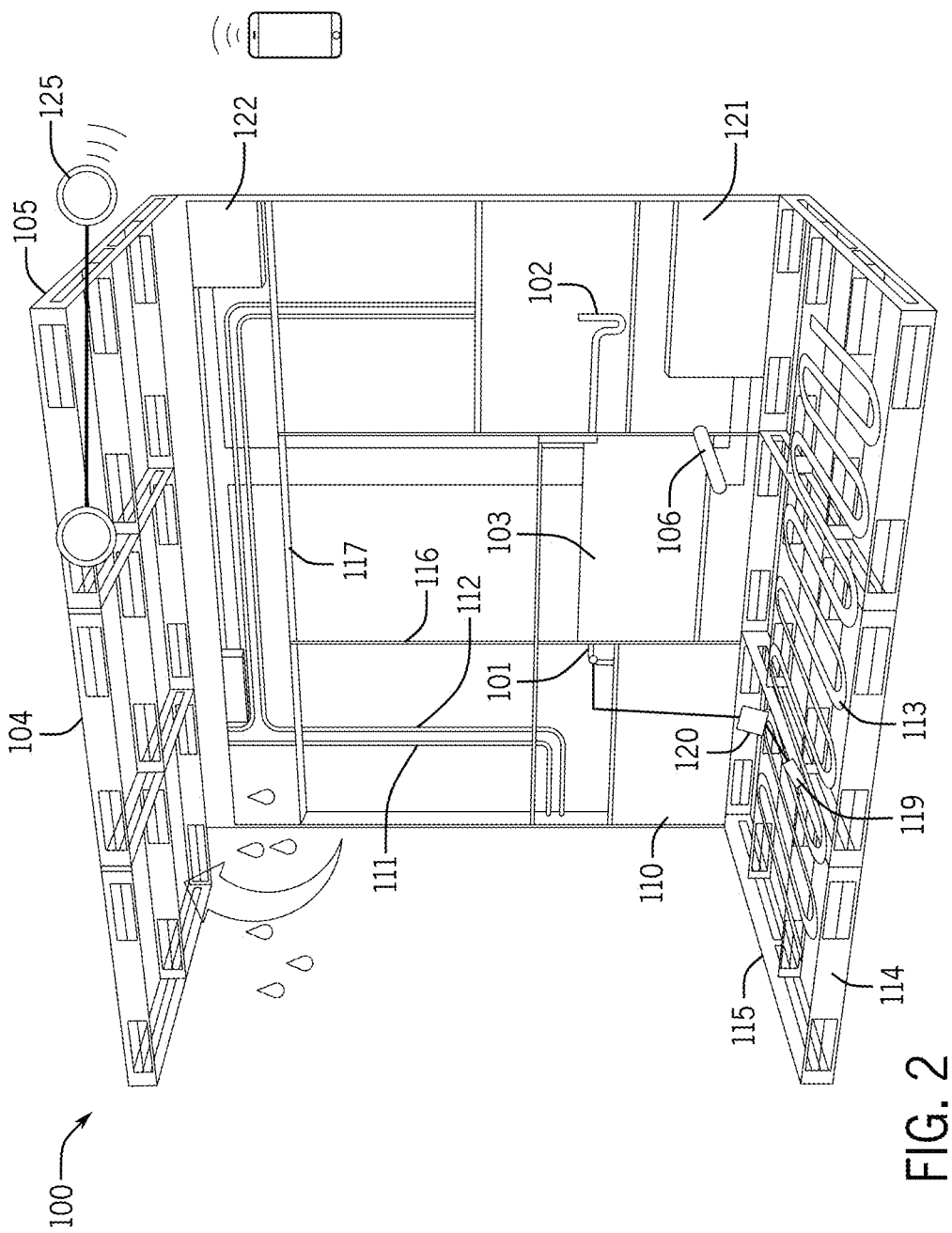
FIG. 2 illustrates the modular flexible frame 100 and associated structure as recycled water system.

FIG. 2 illustrates the modular flexible frame 100 and associated structure as a recycled water system. The frame 100 may include at least one horizontal module and at least one vertical module. As illustrated, the frame 100 includes multiple upper horizontal modules and multiple lower horizontal module. The horizontal modules may include a first set of supports 104 arranged in a first direction and a second set of supports 105 arranged in a second direction. Likewise, the lower horizontal module may include a first set of supports 114 arranged in a first direction and a second set of supports 115 arranged in a second direction. The vertical module may include a first set of supports 117 arranged in a first direction and a second set of supports 116 arranged in a second direction. The upper and lower horizontal modules may be connected to the vertical module using bolts, framing brackets, and/or tongue and groove connections. In addition to the water consuming appliances described herein, the frame 100 may support and be coupled to a heating ventilation and air-condition system, vent, or control panel 122. The frame 100 may support and be coupled to speakers, display, control panels, or other audio-visual components 125. Additional, different, or fewer components may be included in the frame 100.

Figure 3:
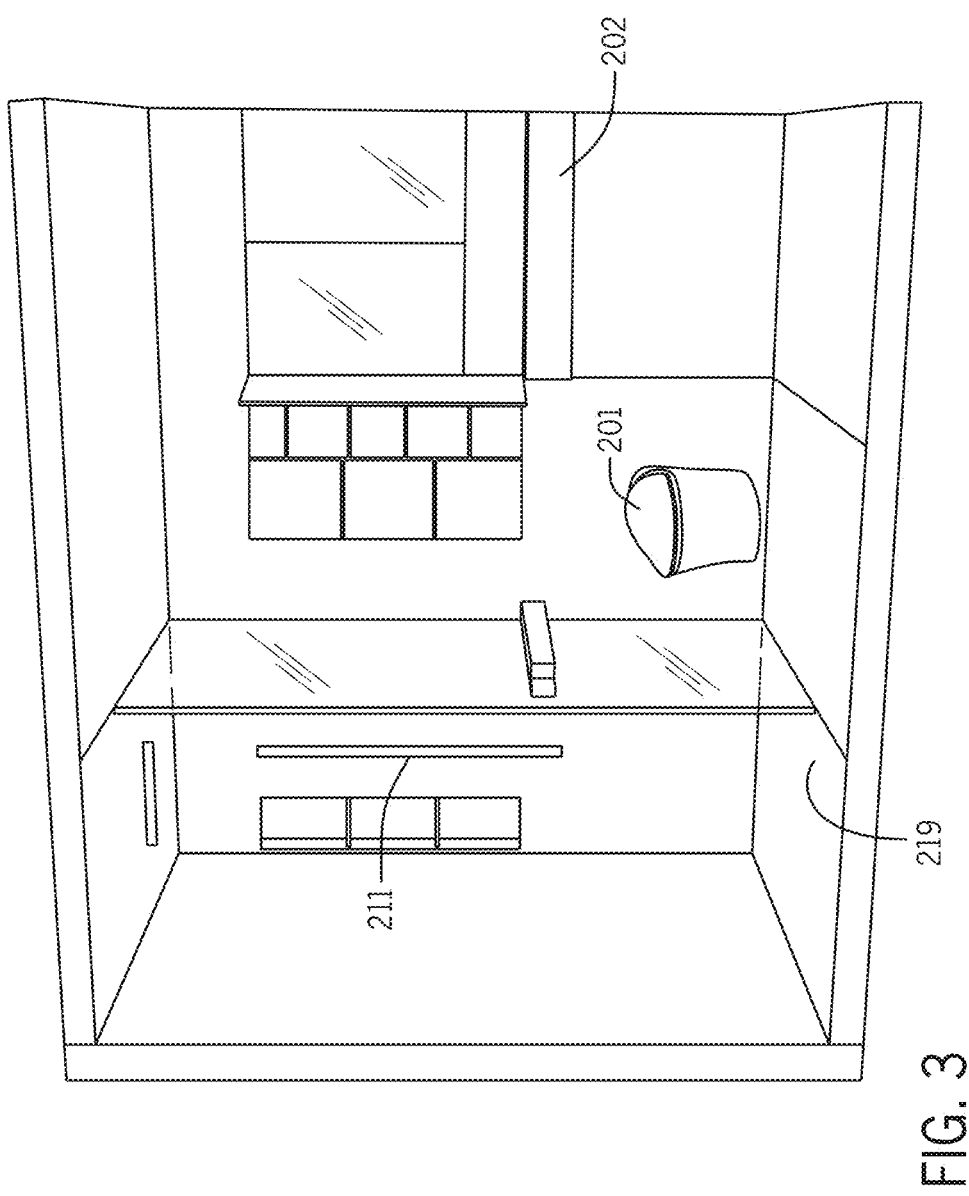
FIG. 3 illustrates a bathroom coupled to the modular flexible frame.

FIG. 3 illustrates a bathroom coupled to the modular flexible frame. The bathroom includes at least a toilet 201, a sink 202, a shower head/sprayer 211, and a drain 219. Additional, different, or fewer components may be included.

The recycled water system may include additional components coupled to or otherwise associated with the frame 100. The frame may support one or more plumbing components include tubes, pipes, adapters, tees, elbows and joints. The plumbing may include parallel supply and drain lines for freshwater and greywater.

Freshwater lines into the system include hot water pipe 111 and cold water pipe 112 may supply water to the sink 202. This water supply may be permanent. That is, the sink 202 is always connected to the hot water pipe 111 and cold water pipe 112. The supply of water to the sink 202 may not be connected to any of the greywater plumbing.

The drain pipe 102 of sink 202 supplies water to a greywater tank 103 or a greywater filter 110. As illustrated, the drain pipe 102 include a P-trap and supplies water from the sink 202 to the greywater filter 110. The drain pipe 102 may include a trap to collected debris and hair before the greywater filter 110. The trap may be accessible through the drain pipe 102 so that the user can clean the trap.

The drain pipe 119 of the shower drain 219 also supplies water to the greywater tank 103 or the greywater filter 110. As illustrated, the drain pipe 119 combines with the drain pipe 102 of the sink 202 above the greywater filter 110 at a joint 101. A pump 120 may pump the drained water from the shower drain 219 up to the joint 101 above the greywater filter 110. The pump 120 may be battery powered or electrically powered by the utility. The pump 120 may be powered by air pressure. The pump 120 may utilize water pressure in the freshwater supply lines. The drain pipe 119 may include a trap to collected debris and hair before the greywater filter 110. The trap may be accessible through the drain pipe 119 so that the user can clean the trap.

The greywater filter 110 may include multiple types of filters. The greywater filter 110 may include fabric or mesh filters. The greywater filter 110 may include a coarse layer of filters and a fine layer of filters. The greywater filter 110 may include a particle filter including sand or another particle. The greywater filter 110 may include a chemical additive or enzyme.

A greywater tank 103 is coupled to the at least one horizontal frame or the at least one vertical frame. The greywater tank 103 receives filtered water from the greywater filter 110. In some embodiment, the greywater tank 103 receives water directly from at least one water consuming appliance drain (i.e., drain pipe 102 or drain pipe 119). The greywater tank 103 supplies water to at least one water consuming appliance. For example, the greywater output pipe 106 may supply water to the toilet 201. In some examples, the greywater tank 103 and/or the greywater output pipe 106 may branch to provide water to another device such as the shower head/sprayer 211. The greywater tank 103 may supply water to other rooms or appliances such as washing machines, greywater sinks, or outdoor sprinkler, hose, or irrigation systems.

In one alternative, rather than within the frame 100, the greywater tank 103 may be mounted on the wall and connected to the toilet 201. The greywater tank 103 may be directly behind the toilet 201. The greywater tank 103 may be above the toilet 201. The greywater tank 103 may be in a closet or other compartment in the vicinity of the toilet 201.

In some examples, the greywater output pipe 106 is combined with a toilet support that extends from the vertical frame. The toilet 201 may be mounted to the toilet support. The toilet 201 may not be supported by the floor or contact the floor. The toilet 201 may be entirely supported by the frame 100. Through the greywater tank 103 within the frame 100, the toilet 201 may be configured to receive an amount of greywater in order to prime the siphon pipe of the toilet and effectively evacuate the waste material from the toilet 201 during a flush cycle. During the flushing cycle, the greywater is present on the waste or septic side of the toilet plumbing fixtures (e.g., on the waste or septic side of a toilet trap, weir, siphon pipe, passage, trapway, etc.) and may also be present in the supply of water to the bowl of the toilet 201. The supply of water on the waste side of the passage, a vacuum may be established within the passage. The vacuum may induce a siphon to evacuate the contents of the bowl, such as with using a reduced amount of water (in total and/or fresh water). The toilet 201 utilizing greywater during a flush cycle and fill cycle provides several advantages, only some of which are discussed. First, the greywater toilet systems disclosed herein may advantageously reduce the amount of fresh water required during each flush cycle, such as by using a volume of greywater in each flush cycle. Further, the actuators that initiate the flush cycles of the toilets disclosed herein may be configured to function using existing methods. For example, the flush cycles of the toilets disclosed herein may be activated by a handle (e.g., a pivoting handle), a lever (e.g., a lift lever), a button (e.g., a push button), or any other conventional actuation device. Thus, from a consumers' perspective, the toilets disclosed herein may advantageously look and be operated like any other toilet.

The toilet 201 may include a tank, a pedestal (or base), and a seat assembly. The greywater tank 103 may include a hollow container for storing the water (e.g., fresh water, greywater) used during operational (e.g., flushing) cycles of the toilet 201, a lid (e.g., cover) for providing selective access into the container, and an actuator that is configured to initiate an operational (e.g., flush) cycle when activated. The actuator may be a button configured to activate when depressed (or pulled) a predetermined distance or when touched (e.g., touch sensitive button), a lever configured to activate when rotated a predetermined angular travel, or any suitable device configured to activate based upon an input manipulation by a user. The actuator may be disposed anywhere on the tank, may be provided on another component of the toilet, such as the base, or may be located remotely from the toilet, such as on a wall or fixture near the toilet.

The toilet 201 may be installed directly to the greywater tank 103. That is, the toilet 201 may not include any additional tank. The toilet 201 may be immediately in front of the location of the greywater tank 103 in the wall. In some examples, only water from the greywater tank 103 is supplied to the toilet 201. In some instances, more greywater is supplied to the greywater tank 103 that can be used by the water consuming appliances. In this case, the greywater tank 103 may overflow or drain the excess greywater. In some instances, less greywater is supplied to the greywater tank 103 that is used by the water consuming appliances. In this case, the greywater tank 103 may also be configured to receive freshwater to supply to the water consuming appliances. The greywater tank 103 may include one or more sensors or valves according to the examples in FIGS. 4-6.

The greywater tank 103 may include an inlet opening configured to receive water (e.g., fresh water) from a coupled water supply, such as through a hose (e.g., hot water pipe 111 and/or cold water pipe 112). In other words, the greywater tank 103 may receive a supply of fresh water through the inlet from a fresh water source, which may be a water line of the dwelling in which the toilet 201 is installed. The greywater tank 103 may also include an inlet valve assembly or other device configured to control the flow of fresh water from the fresh water source or supply into the tank through the inlet.

Figure 4:
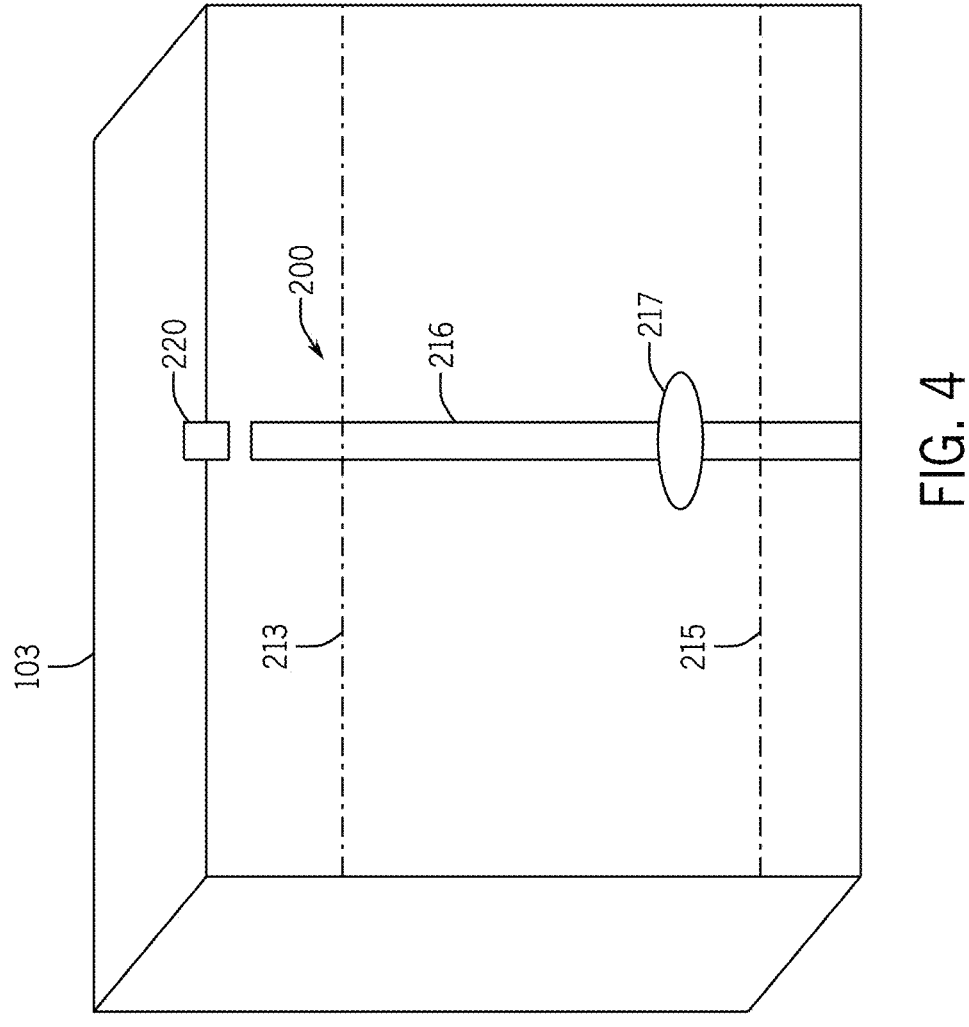
FIG. 4 illustrates an example first embodiment of the greywater tank.

FIG. 4 illustrates an example first embodiment of the greywater tank 103 include a water level sensor system 200 including a floating level 217 slidably mounted on a vertical shaft 216. The position of the level 217 may be detected by a sensor 220. The sensor 220 determines the distance from the sensor 220 to the floating level 217 using an image sensor that detects an image of the level 217 or a light sensor that emits a light that reflects from the floating level 217. The sensor 220 may output a detection signal to a controller or a valve system that opens or closes one or more paths to or from the greywater tank 103. Alternatively, the level 217 may be connected to a mechanical sensor that moves a cable or lever according to the position of the floating level 217.

For example, when the water level in the greywater tank 103 is above a first predetermined water level 213, a valve may be opened to drain excess greywater from the greywater tank 103 to become wastewater for the sewage or septic drain.

In addition or in the alternative, when the water level in the greywater tank 103 is below a predetermined water level 215, a valve may be opened to allow freshwater to be added to the greywater tank 103 so that there is enough water to flush the toilet 201. While only predetermined water level 215 is shown, it may actually include two water levels. A first level that triggers the start of the additional flow of water and a second level that triggers the stop of the additional flow of water. In addition or in the alternative, when the water level in the greywater tank 103 is below a predetermined water level 215, a valve may be opened to allow another source of greywater (e.g., second tier greywater or third tier greywater as described herein).

Figure 5:
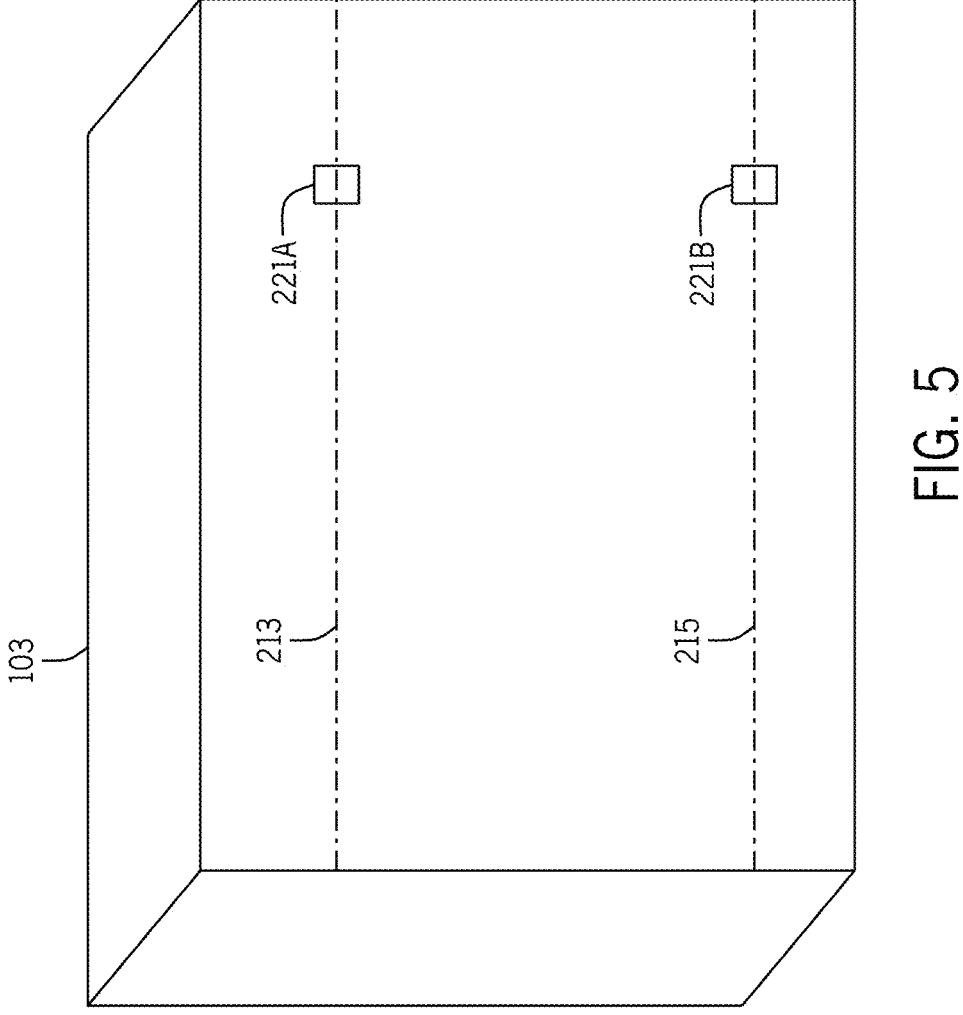
FIG. 5 illustrates an example second embodiment of the greywater tank.

FIG. 5 illustrates an example second embodiment of the greywater tank 103. In this example, the water level sensor associated with the greywater tank 103 includes water sensors 221A and 221B at the predetermined water levels 213 and 215, respectively. The water sensors 221A and 221B may include pressure level sensor that determines the pressure of water above the submersed sensor, an ultrasonic water level sensor that emits acoustic waves from a transducer and measures the reflected waves, a capacitance Level sensor or radio frequency sensor that measures the capacitance between two points in the greywater tank 103, or a radar level sensor that emits and detects a radar signal to determined the water level in the greywater tank 103.

Figure 6:
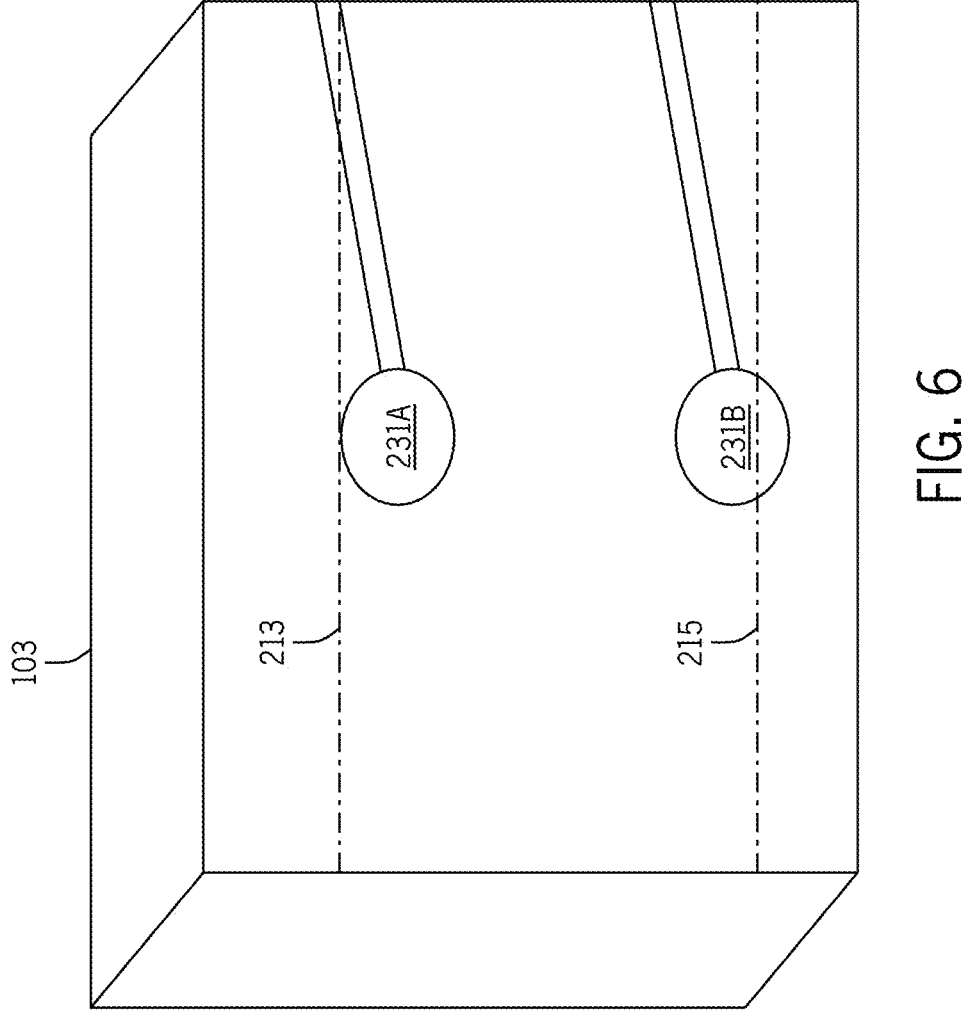
FIG. 6 illustrates an example third embodiment of the greywater tank.

FIG. 6 illustrates an example third embodiment of the greywater tank 103. In this example, a first ball float 231A mounted on a rod is associated with the predetermined level 213 and a second ball float 231B mounted on a rod is associated with the predetermined level 215. Each of the floats and rods may be connected to a different valve. For example using ball float 231A, when the water level in the greywater tank 103 is above a first predetermined water level 213, a valve (e.g., second valve) may be opened to drain excess greywater from the greywater tank 103 to become wastewater for the sewage or septic drain. In addition or in the alternative, using ball float 231B, when the water level in the greywater tank 103 is below a predetermined water level 215, a valve (e.g., first valve) is configured to selectively supply freshwater and/or other greywater to the greywater tank 103.

Figure 7:
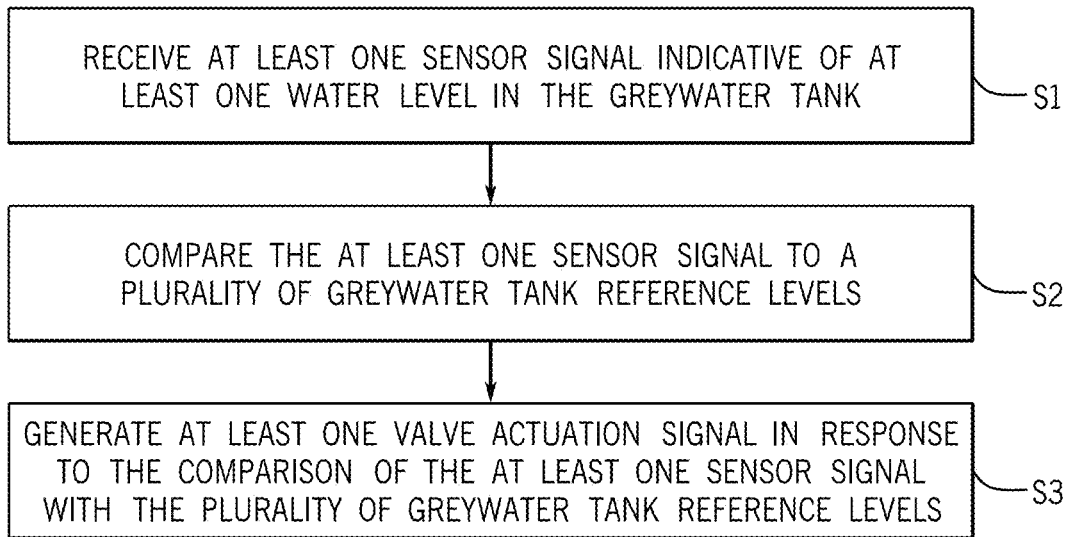
FIG. 7 illustrates a flow chart for operation of the greywater tank.

FIG. 7 illustrates a flowchart for operation of the greywater tank. The acts of the flowchart may be performed by the control system of the recycled water system described herein. One or more acts of the flowchart may be performed manually or mechanically (e.g., without the control system). The acts of the flow chart may be performed by any combination of the control system 400, the network device or the server. Portions of one or more acts may be performed by the appliance. Additional, different of fewer acts may be included.

At act S1, at least one sensor signal indicative of at least one water level in the greywater tank is received. The at least one sensor signal may be received from any of the level sensors described herein. The at least one sensor signal may include multiple signals, each corresponding to a different level sensor. The at least one sensor signal is generated at a pressure level sensor, an ultrasonic water level sensor a capacitance level sensor, or a radio frequency sensor.

At act S2, the at least one sensor signal is compared to a plurality of greywater tank reference levels. The comparison may be performed by the control system (e.g., processor) by comparing reference level data to one or more levels in the at least one signal. The at least one sensor signal includes a first sensor signal associated with a first predetermined level in the greywater tank and a second sensor signal associated with a second predetermined level in the greywater tank. The first predetermined level is associated with an upper threshold and a drain to remove water from the greywater tank. The second predetermined level is associated with a lower threshold and an input to add water to the greywater tank. Alternatively, the comparison may be performed mechanically or manually.

At act S3, at least one valve actuation signal is generated in response to the comparison of the at least one sensor signal with the plurality of reference level. The at least one valve actuation signal may include a first valve actuation signal and a second valve actuation signal. The first valve actuation signal triggers a first valve to drain water from the greywater tank and the second valve actuation signal triggers a second valve to add water to the greywater tank. The first valve is configured to open or close a drain line to a black water system and the second valve is configured to open or close a supply line coupled to at least one water consuming device.

Figure 8:
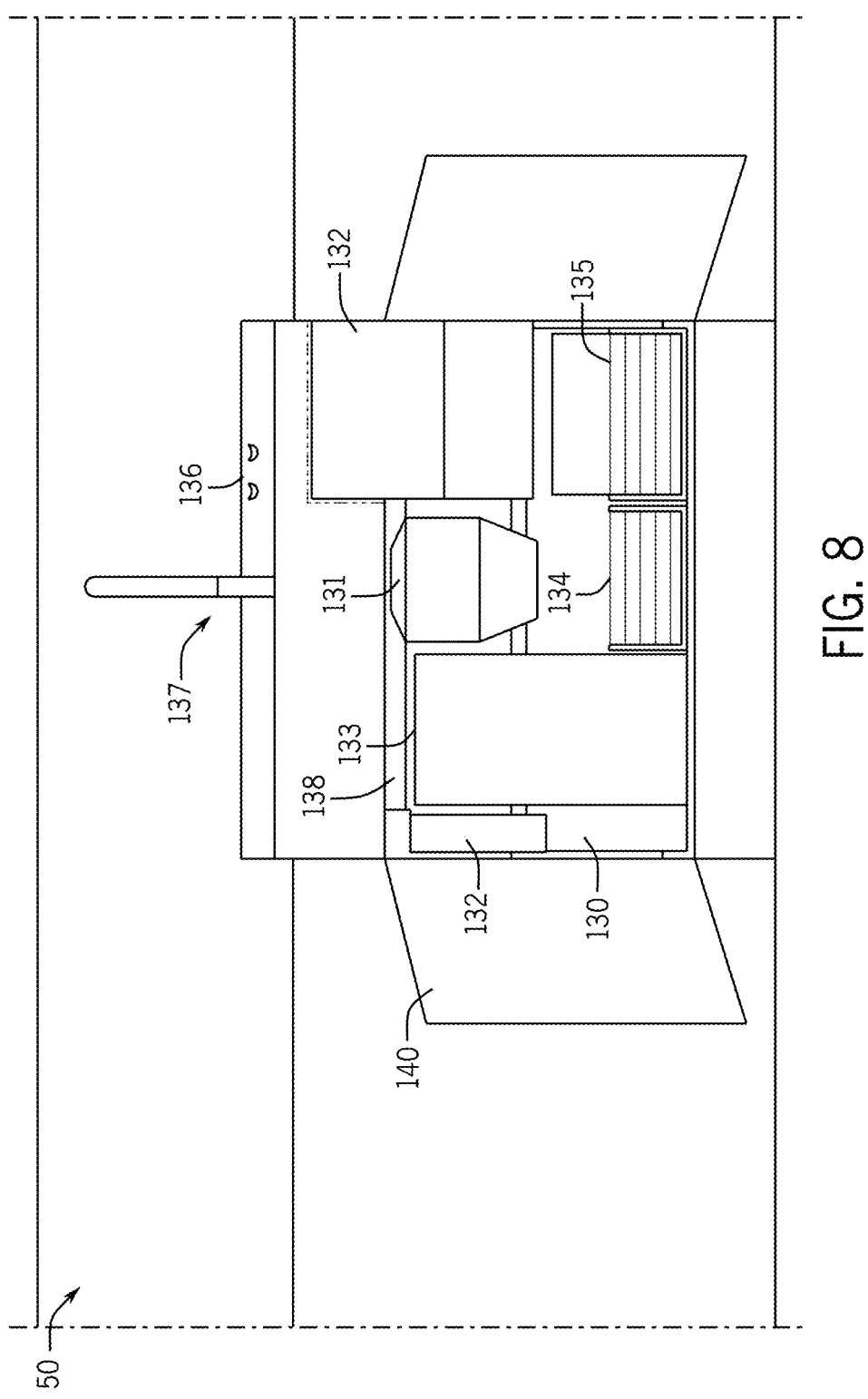
FIG. 8 illustrates a recycled water system of a kitchen.

FIG. 8 illustrates a recycled water system 50 of a kitchen. The system 50 may include any combination of a greywater tank 130, a garbage disposal 131, a dishwasher 132, a trash compartment 133, a storage compartment or a compost compartment 134, a recycle compartment 135, a soap dispenser 136, a faucet, a sink 137, and a manifold 138. The greywater tank 130 may be replaced or connected to the greywater tank 103 associated with the bathroom. Additional, different or fewer components may be included.

Figure 9:
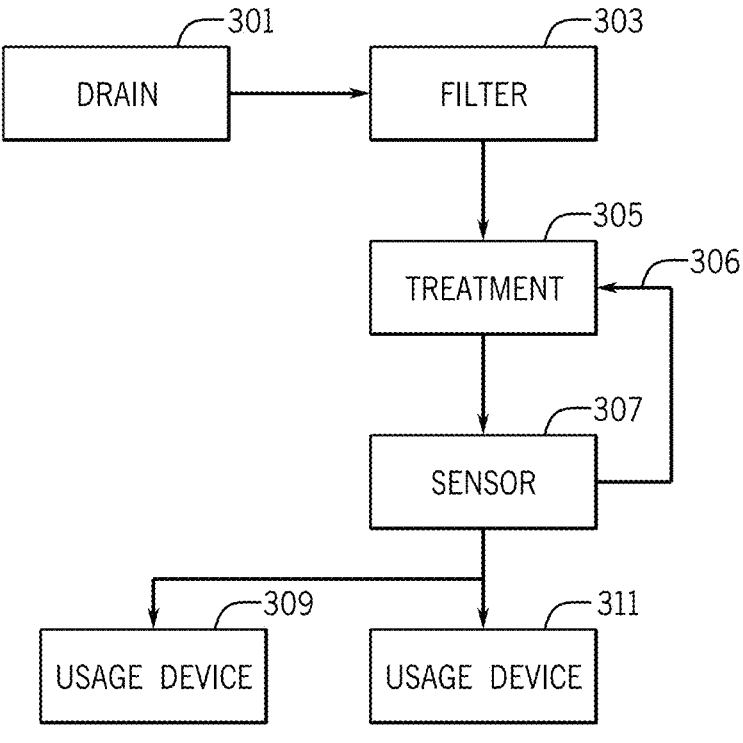
FIG. 9 illustrates a block diagram for the recycled water system of the kitchen of FIG. 8.

FIG. 9 illustrates an example block diagram for a greywater processing sequence. One or more of the appliances in FIG. 8, including dishwasher 132 and sink 137, may include a drain 301. The drain 301 may also be associated with another appliance such as a bathroom appliance or a laundry appliance. Water collected by the drain 301 may be considered greywater. The greywater may be received and distributed by the manifold 138, which includes one or more valves and pipes for receive and directing the flow of water.

The manifold 138 and/or the greywater tank 130 may include any combination of a filter 303, a treatment system 305, a sensor 307, and a feedback path 306. The feedback path 306 may include a path that recirculated water through the treatment system 305.

The filter 303 is configured to receive greywater from at least one water consuming appliance. The filter 303 may include any of the example filters described herein including mesh filters, fabric filters, biologically activated filters, or particle filters. The treatment system 305 is configured to treat the filtered greywater. The treatment may be any of the examples described herein including chlorination, reverse osmosis, bioreaction, coagulation, flocculation, or oxidation using titanium dioxide and ultraviolet light.

The treatment system 305 may be combined with the greywater tank 103. For example, a strainer may be disposed in a container that holds pellets or a liquid solution of chemical compound, where the strainer includes one or more holes that fluidly communicate with water in the reservoir of the greywater tank 103. The chemical compound may be chlorines or titanium dioxide.

Also, for example, a diffusing tube fluidly may be provided. The diffusing tube may include a plurality of spaced apart openings fluidly connecting an inside of the tube to the reservoir of the greywater tank 103. A delivery system may provide for refilling chemical compound from a position forward of a wall of the greywater tank 103 and for dispensing in a forward direction from the front wall.

The sensor 307 is configured to detect a property of the treated greywater from the treatment system 305. The property may be any combination of the transparency of the water, the turbidity of the water, the pH of the water, the biological oxygen demand, biochemical oxygen demand (BOD), total suspended solids (TSS), fecal coliform content, E. Coli content, or residual chlorine.

A control circuit or controller may compare the property of the treated greywater to a threshold. A feedback system including feedback path 306 is configured to return threated greywater from the delivery device to the treatment device in response to the property of the treated greywater. That is, if one or more standards for the property of the greywater are not met, the treated water is feedback to the treatment system 305 for additional treatment.

The manifold 138 and/or the greywater tank 130 is an example delivery device configured to provide the treated greywater from the treatment device to at least one greywater consuming device illustrated as usage devices 309 and 311.

The at least one greywater consuming device may include the dishwasher 132. In this example, the manifold 138 routes the greywater from the greywater tank 130 to the dishwasher 132 for washing and/or rinsing dishes. The dishwasher 132 may be a top load dishwasher housed within a drawer. The dishwasher 132 may heat the greywater to a predetermined temperature for further treatment.

Figure 10:
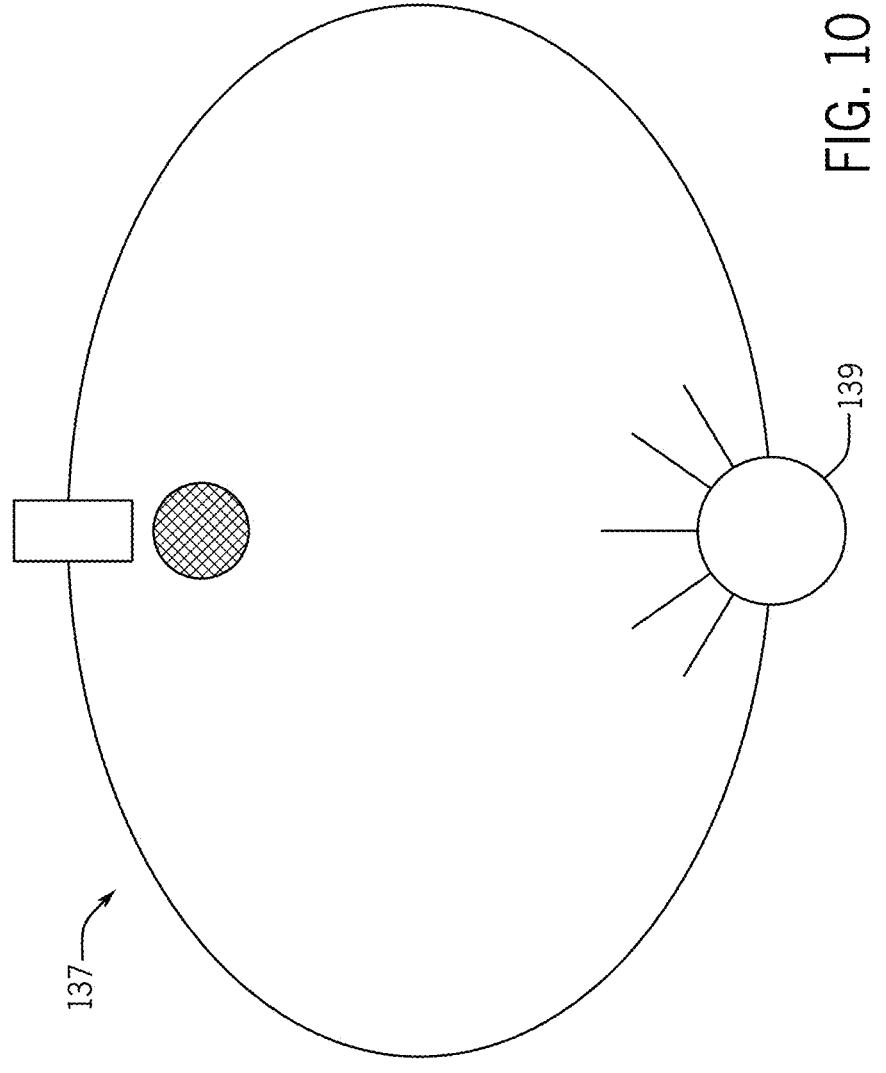
FIG. 10 illustrates a basin sprayer.

The at least one greywater consuming device may include a basin sprayer 139 for the sink 137, as shown by FIG. 10. The basin sprayer 139 is mounted on an internal side of the sink basin, incorporated in the faucet, or above the sink 137. The basin sprayer 139 may be positioned lower than the countertop but higher than the bottom surface of the sink.

The basin sprayer 139 uses less water than the faucet of the sink 137. The basin spray may also utilize greywater because the output is not intended for human consumption. It may be difficult to collect water from the basin spray in a glass, to further deter human consumption. In addition, the basin sprayer 139 may be marked not for human consumption. The basin sprayer 139 may be turned on and off by a controller. The controller may receive an input from a sensor (e.g., motion sensor or infrared sensor) that detected movement of the user or an object in a predetermined position or in the sink. The predetermined position may be a particular side or corner of the sink. In response to the input from the sensor, the controller turns on the basin sprayer 139. The controller may turn off the basin sprayer 139 after a time period elapses. The time period may be configurable by the user.

Figure 11:
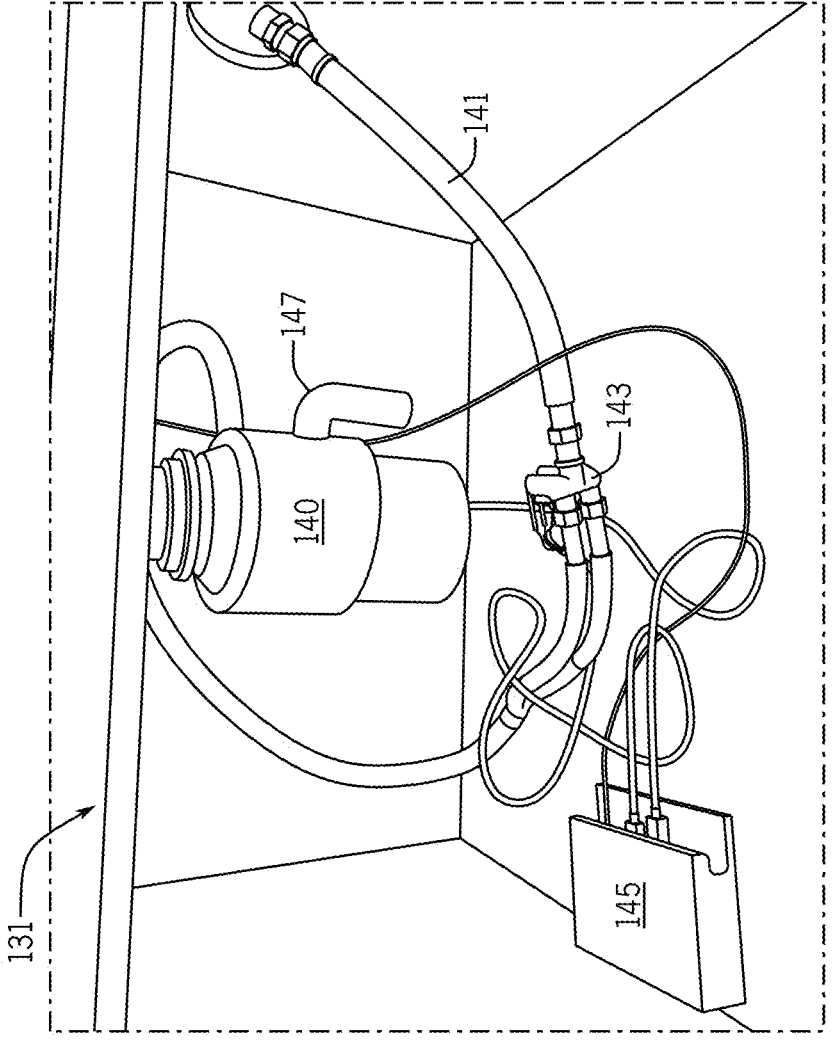
FIG. 11 illustrates a direct injection garbage disposal.
Figure 12:
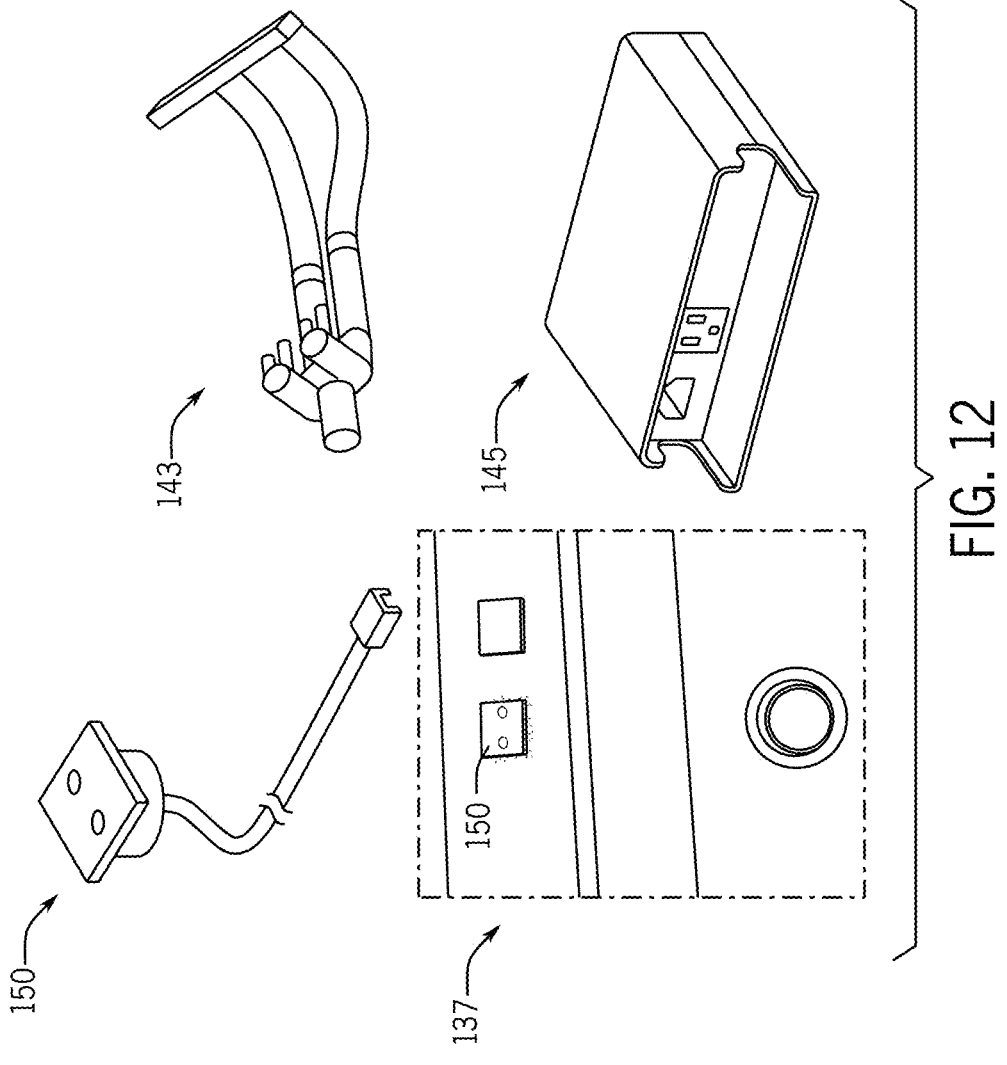
FIG. 12 illustrates detailed components of the direct injection garbage disposal of FIG. 11.

The at least one greywater consuming device may include a direct injection garbage disposal 131, as illustrated by FIG. 11. In addition, FIG. 12 illustrates detailed components of the direct injection garbage disposal 131 of FIG. 11 in one example. Additional, different, or fewer components may be included. The garbage disposal 131 includes a chamber 140, an input tube 141, a valve assembly 143, a controller 145, and a drain 147 (connected to a hose or other drainpipe not shown). The garbage disposal 131 may also included a cutting mechanism driven by a motor, a dishwasher input tube, and a power connection and wires. Additional, different, or fewer components may The input tube 141 may be connected to the greywater tank 130 of the kitchen and/or the greywater tank 103 of the bathroom. The input tube 141 is coupled to the valve assembly 143 for controlling the flow of greywater into the garbage disposal 131. The valve assembly 143 may be a single tube and valve. The water supply to the kitchen faucet that is within the kitchen cabinet could have a Y valve assembly (as illustrated in FIG. 11) with one branch going to the garbage disposal 131. The valve assembly 143 may include its own shut off valve or omit the shut off valve.

The controller 145 may drive the valve assembly 143 to open or close a valve to the garbage disposal 131. The controller 145 may generate a command to the valve assembly 143. The command may be to open valve the or close the valve. In some examples, the valve may have variable settings (e.g., water volume control) set by the command. The controller 145 may generate a command to the garbage disposal 131 (turn on motor or turn off motor). In the example of a variable speed garbage disposal, the speed of the motor may be set by the command.

The controller 145 may receive a user input from switch 150. As shown in FIG. 12, the switch 150 may be mounted near the countertop adjacent to the sink 137. The switch 150 may included a push button. The switch 150 may include a mechanical switch that opens or closes an electrical switch to the controller 145. Alternatively, the switch 150 may be on a circuit to directly control to the garbage disposal 131 and/or valve assembly 143. The switch 150 may be a capacitance switch that generates an electrical signal to the controller 145 when the user touches the switch 150. The capacitance switch may generate a signal proportional to the duration that the user contacts the switch. The switch 150 may included a microphone for voice controls.

The controller 145 may define one or more cycles, which are implemented by the commands to the garbage disposal 131 and valve assembly 143. The cycle may be selected according to the duration that the user touches the switch 150. Alternatively, multiple buttons or a sequence of presses may be used. Note that the commands may be combined in a single signal to both the garbage disposal 131 and valve assembly 143 (e.g., pulse width modulated signal). In one example, the controller 145 selects between a short cycle and a long cycle. The short cycle may include a first time period for operating the garbage disposal 131 and/or valve assembly 143. The short cycle may include a second time period for operating the garbage disposal 131 and/or valve assembly 143 such that the second time period is longer than the first time period. More specifically, either cycle may include turning on the water via the valve assembly 143, then turning on the garbage disposal 131 for a disposal time period, and then turning off the valve assembly when a water time period elapses. Note that the kitchen faucet may not be involved in these cycles.

In another example, the at least one greywater consuming device includes a compost compartment sprayer for cleaning the compost compartment 134. The compost compartment sprayer may use the valve assembly 143 and controller 145 described above. In another example, the at least one greywater consuming device includes a sprayer for the trash compartment 133 or the recycle compartment 135, which may also use the valve assembly 143 and controller 145 described above.

Figure 13:
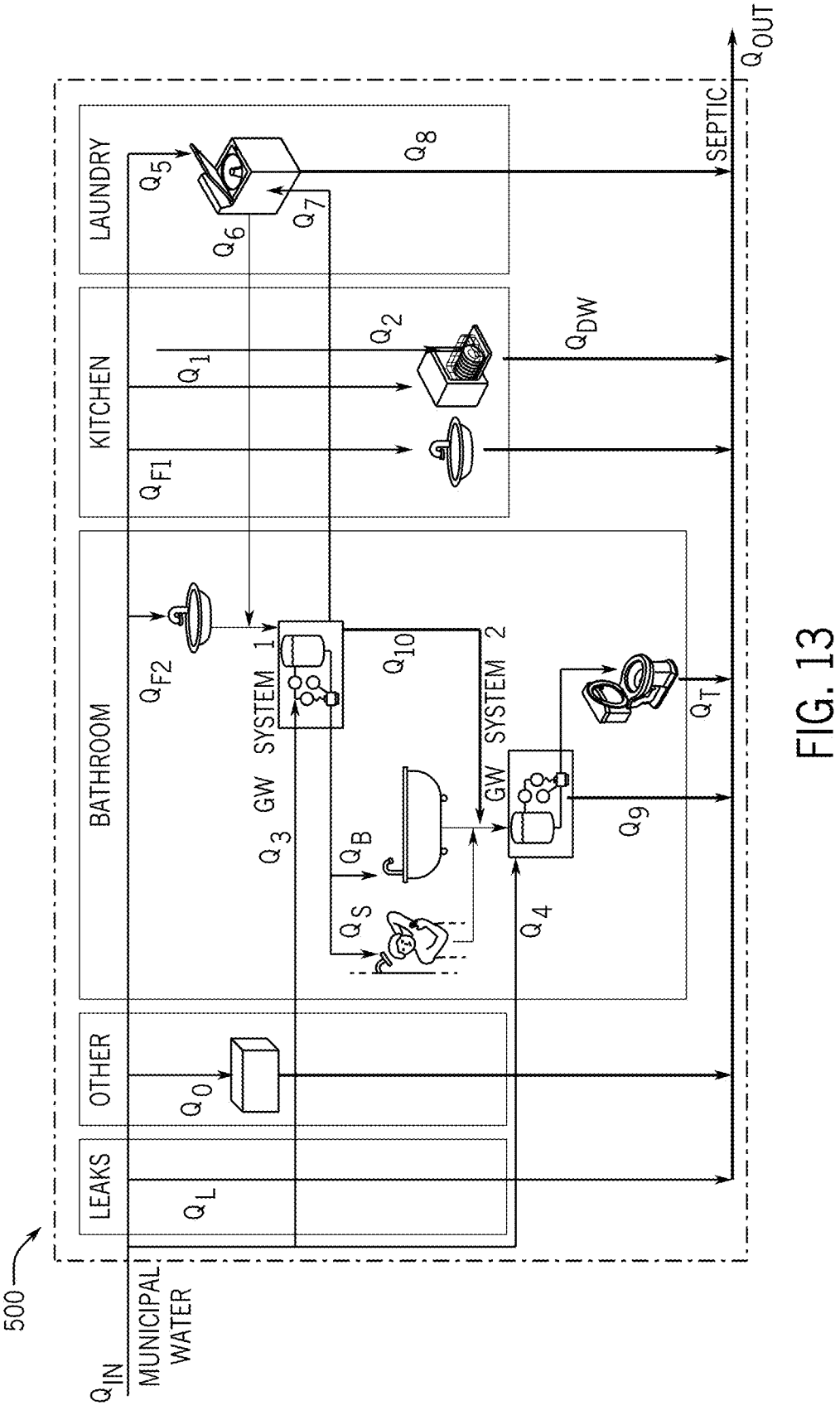
FIG. 13 illustrates a whole home recycled water system.

FIG. 13 illustrates a whole home recycled water system 500. The system extends from an input flow $Q_{in}$ from the local water supply (e.g., municipality or well) to an output flow $Q_{out}$ to the wastewater system (e.g., septic tank or sewer system). There may be many variations on how to lay out the inputs and outputs depending upon the technology used in each system. The example of FIG. 13 includes the consumption of water in zones, bathroom, kitchen, laundry, leaks, and other. The example of FIG. 13 includes two greywater systems (GW system 1 and GW system 2) as two separate units to detail the inputs and outputs, but as a final device it may be combined into a single unit. This achieves many efficiencies (manufacturing, operating, maintaining, etc.).

In a first embodiment, the multi-stage water recycling system may include a first set of water consuming appliances that consumes fresh water and outputs a first tier of greywater, a first water recycling treatment device that treats the first tier of greywater and outputs a treated first tier of greywater, a second set of water consuming appliances that consumes the treated first tier of greywater and outputs a second tier of greywater, a second water recycling treatment device that treats the second tier of greywater and outputs a treated second tier of greywater, and a third set of water consuming appliances that consumes the treated second tier of greywater.

In the first embodiment, the first set of water consuming appliances include at least one potable water appliance such as a faucet, a water cooler, a refrigerator, or an icemaker. The second set of water consuming appliances include at least one bathing appliance. The bathing appliance may include a bathtub or a shower. The third set of water consuming appliances includes a toilet. In this embodiment, the second water recycling treatment device includes a filter or a chlorinator. The first water recycling treatment device includes a membrane bioreactor or a reverse osmosis filter.

In a second embodiment, the multi-stage water recycling system includes a first set of water consuming appliances that consumes fresh water and outputs a first tier of greywater, a first water recycling treatment device that treats the first tier of greywater and outputs a treated second tier of greywater, a second water recycling treatment device that treats a first portion of the treated second tier of greywater to a first tier of greywater, a second set of water consuming appliances that consumes a second portion of the treated second tier of greywater and outputs wastewater, and a third set of water consuming appliances that consumes a portion of the first tier of greywater. A portion of the treated first tier of greywater from the second water recycling treatment device is provided to the first water recycling treatment device.

In the second embodiment, the first set of water consuming appliances include at least one potable water device, the second set of water consuming appliances includes a toilet, and the third set of water consuming appliances includes at least one bathing appliance. In the second embodiment, the first water recycling treatment device includes a filter or a chlorinator and the second water recycling treatment device includes a membrane bioreactor or a reverse osmosis filter.

Figure 14:
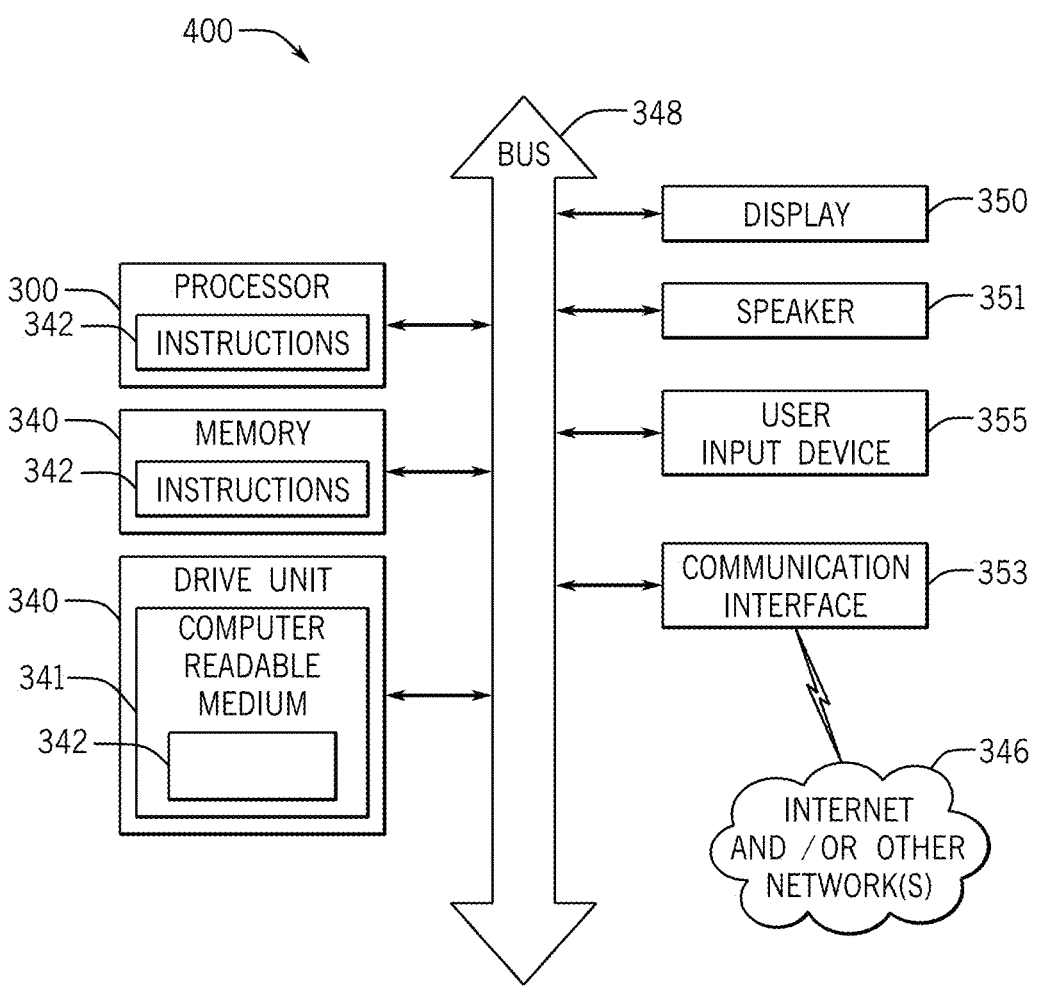
FIG. 14 illustrates an example controller for the recycled water system.

FIG. 14 illustrates an example controller 400 for the recycled water system. The controller 400 may include a processor 300, a memory 352, and a communication interface 353 for interfacing with devices or to the internet and/or other networks 346. In addition to the communication interface 353, a sensor interface may be configured to receive data from the sensors described herein or data from any source for analyzing water properties or the operation of the appliances described herein. The components of the control system 400 may communicate using bus 348. The control system 400 may be connected to a workstation or another external device (e.g., control panel) and/or a database for receiving user inputs, system characteristics, and any of the values described herein.

Optionally, the control system 400 may include an input device 355 and/or a sensing circuit in communication with any of the sensors. The sensing circuit receives sensor measurements from as described above. The input device 355 may include the switch 150, a touchscreen coupled to or integrated with the mirror, a keyboard, a microphone for voice inputs, a camera for gesture inputs, and/or another mechanism.

Optionally, the control system 400 may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be supported by the mirror frame. The display 350 may be combined with the user input device 355.

Figure 15:
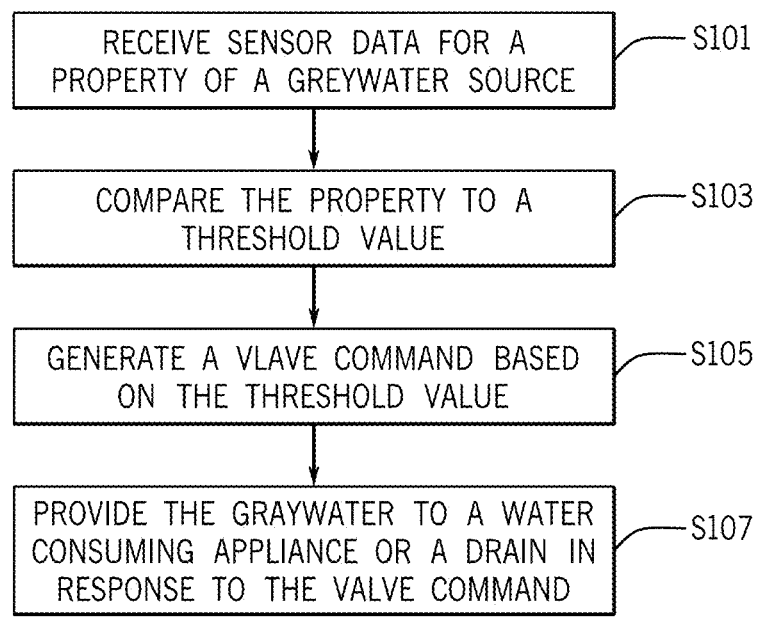
FIG. 15 illustrates a flow chart for the controller of the recycled water system.

FIG. 15 illustrates a flow chart for the control system 400 of the recycled water system. The acts of the flow chart may be performed by any combination of the control system 400, the network device or the server. Portions of one or more acts may be performed by the appliance. Additional, different of fewer acts may be included.

At act S101, the controller 400 (e.g., through processor 300) receives sensor data for a property of a greywater source. The greywater source may be a tank and the sensor data may describe the level of the water in the tank. The greywater source may be a tank and the sensor data may describe the quality of the water in the tank. Example quality measures may include the level of biological material, the level of contaminants, the turbidity or any of the examples described herein. The greywater source may be a tube or pipe from a greywater treatment system and the sensor data may describe the quality of the greywater flowing through the tube or pipe. The greywater source may be a water consuming appliance tank and the sensor data may describe the quantity or quality of the output of water from the water consuming appliance. The sensor data, or a statistical parameter of the sensor data, may be displayed at display 350 or sent to the user or a central location through the communication interface 353.

At act S103, the controller 400 (e.g., through processor 300) compares the property of the greywater source to a threshold value. The threshold may be a predetermined value stored in memory 352. The threshold may be received from communication interface 353 from an external device over the network 346. The external device may be a municipality, a central controller, or a user device (e.g., mobile phone). The threshold may be received from user input device 355. The threshold may include a value for one or more of the transparency of the water, the turbidity of the water, the pH of the water, the biological oxygen demand, biochemical oxygen demand (BOD), total suspended solids (TSS), fecal coliform content, *E. coli* content, or residual chlorine.

At act S105, the controller 400 (e.g., through processor 300) generates a valve command based on the comparison. The valve command may instruct a valve to open, to close, or partially open or close to another position. The valve may allow a predetermined quantity of water to enter the greywater tank. The valve may allow a predetermined quantity of water to drain from the greywater tank. The valve may allow a predetermined quantity of water to exit a water consuming device to a particular greywater system. The valve may allow a predetermined quantity of water to enter a water consuming device from a particular greywater system.

Figure 16:
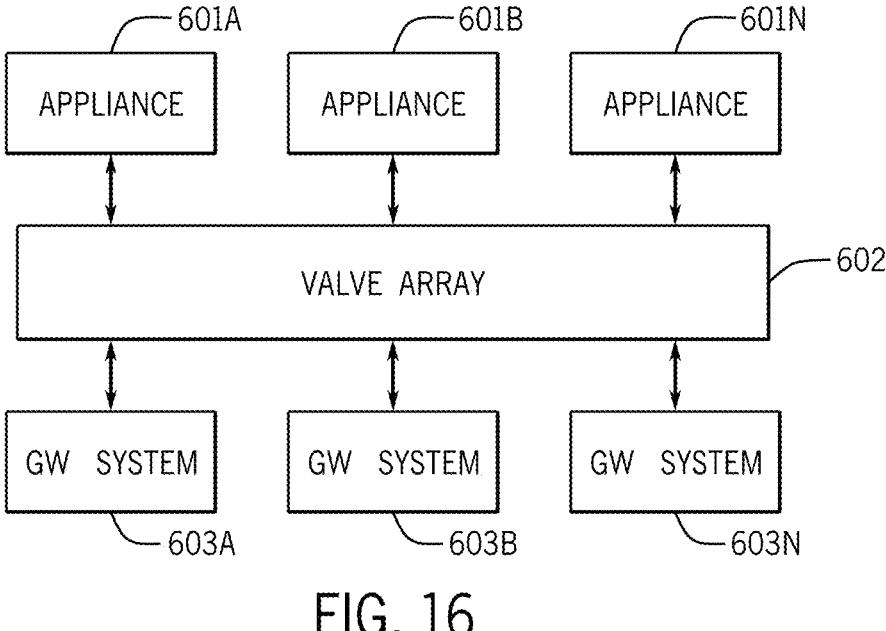
FIG. 16 illustrates an example valve array.

The valve command may be provided to a valve array or water manifold. The valve array may control the water flow from multiple water consuming appliances and to and from multiple water consuming appliances. FIG. 16 illustrates an example of a valve array 602 that can open or close any output of a plurality of water consuming appliances 601A-N to any of a plurality of greywater systems 603A-N (e.g., including filtering, treatment, sensing, etc). The valve array 602 may open or close a connection between any of the plurality of water consuming appliances 601A-N so that greywater is provided from one appliance directly to another appliance. The valve array 602 may open or close a connection from any of the greywater systems 603A-N to any of the water consuming appliances 601A-N. At act S107, the system, for example, through the valve array 602 provides the greywater to a water consuming appliance or a drain in response to the valve command.

Processor 300 may be a general purpose or specific purpose processor, an application specific integrated circuit (ASIC), one or more programmable logic controllers (PLCs), one or more field programmable gate arrays (FP-GAs), a group of processing components, or other suitable processing components. Processor 300 is configured to execute computer code or instructions stored in memory 352 or received from other computer readable media (e.g., embedded flash memory, local hard disk storage, local ROM, network storage, a remote server, etc.). The processor 300 may be a single device or combinations of devices, such as associated with a network, distributed processing, or cloud computing.

Memory 352 may include one or more devices (e.g., memory units, memory devices, storage devices, etc.) for storing data and/or computer code for completing and/or facilitating the various processes described in the present disclosure. Memory 352 may include random access memory (RAM), read-only memory (ROM), hard drive storage, temporary storage, non-volatile memory, flash memory, optical memory, or any other suitable memory for storing software objects and/or computer instructions. Memory 352 may include database components, object code components, script components, or any other type of information structure for supporting the various activities and information structures described in the present disclosure. Memory 352 may be communicably connected to processor 300 via a processing circuit and may include computer code for executing (e.g., by processor 300) one or more processes described herein. For example, memory 298 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 353 may include any operable connection. An operable connection may be one in which signals, physical communications, and/or logical communications may be sent and/or received. An operable connection may include a physical interface, an electrical interface, and/or a data interface. The communication interface 353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

What is claimed is:

1. A modular wall frame for a recycled water system, the modular wall frame comprising:
   a horizontal frame module as a floor or ceiling of a building;
   a vertical frame module that is configured to fit within and mounted into a wall of the building;
   a greywater tank coupled to the vertical frame within the wall of the building;
   at least one water consuming appliance drain coupled to the horizontal frame module; and
   at least one water consuming appliance water input coupled to the vertical frame module.

2. The modular wall frame of claim 1, further comprising:
   at least one fresh water supply line supported by the modular wall frame and coupled to the vertical frame.

3. The modular wall frame of claim 1, further comprising:
   at least one greywater supply line supported by the modular wall frame and coupled to the vertical frame.

4. The modular wall frame of claim 1, further comprising:
   a pump coupled to the greywater tank.

5. The modular wall frame of claim 1, further comprising:
   a filter upstream of the greywater tank.

6. The modular wall frame of claim 1, further comprising:
   a water level sensor associated with the greywater tank.

7. The modular wall frame of claim 6, further comprising:
   a first valve configured to selectively supply freshwater to the greywater tank when a level in the greywater tank falls below a first predetermined level.

8. The modular wall frame of claim 6, further comprising:
   a second valve configured to selectively remove greywater from the greywater tank when a level in the greywater tank rises above a second predetermined level.

9. The modular wall frame of claim 6, wherein the horizontal frame module or the vertical frame module is configured to support:
   a first set of water consuming appliances that consumes fresh water and outputs a first tier of greywater;

a first water recycling treatment device that treats the first tier of greywater and outputs a treated first tier of greywater;

a second set of water consuming appliances that consumes the treated first tier of greywater and outputs a second tier of greywater;

a second water recycling treatment device that treats the second tier of greywater and outputs a treated second tier of greywater; and a third set of water consuming appliances that consumes the treated second tier of greywater.

10. A water recycling system comprising:

a module frame including a wall portion, a floor portion, and a ceiling portion;

a filter configured to receive and filter greywater from at least one water consuming appliance;

a treatment device configured to treat the greywater from the filter; and a delivery device within the wall portion of the module frame and configured to provide the greywater from the treatment device to at least one greywater consuming device.

11. The water recycling system of claim 10, further comprising:

at least one sensor configured to detect a property of the treated greywater from the treatment device.

12. The water recycling system of claim 11, further comprising:

a feedback system configured to return treated greywater from the delivery device to the treatment device in response to the property of the treated greywater.

13. The water recycling system of claim 10, wherein the at least one greywater consuming device includes a dishwasher.

14. The water recycling system of claim 10, wherein the at least one greywater consuming device includes a garbage disposal.

15. The water recycling system of claim 10, wherein the at least one greywater consuming device includes a basin sprayer.

16. The water recycling system of claim 10, wherein the at least one greywater consuming device includes a compost compartment sprayer.

17. The water recycling system of claim 10, wherein the at least one greywater consuming device includes a trash compartment sprayer.

18. A modular wall frame for a recycled water system, the modular wall frame comprising:

an upper horizontal frame module within a ceiling of a building;

a lower horizontal frame module within a floor of the building;

a vertical frame module within a wall of the building;

wherein the lower horizontal frame module or the vertical frame module is coupled to a greywater tank;

wherein the lower horizontal frame module or the vertical frame module is coupled to at least one water consuming appliance drain; and wherein the lower horizontal frame module or the vertical frame module is coupled to at least one water consuming appliance water input.

19. The modular wall frame of claim 18, further comprising:

at least one fresh water supply line supported by the modular wall frame and coupled to the vertical frame.

20. The modular wall frame of claim 18, further comprising:

at least one greywater supply line supported by the modular wall frame and coupled to the vertical frame.

* * * * *